United States Patent
Jia

(10) Patent No.: US 12,205,222 B2
(45) Date of Patent: *Jan. 21, 2025

(54) GENERATING AND DISPLAYING TEXT IN A VIRTUAL REALITY ENVIRONMENT

(71) Applicant: INTUIT INC., Mountain View, CA (US)

(72) Inventor: Shaozhuo Jia, Mountain View, CA (US)

(73) Assignee: INTUIT INC., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/537,592

(22) Filed: Dec. 12, 2023

(65) Prior Publication Data

US 2024/0257453 A1    Aug. 1, 2024

Related U.S. Application Data

(63) Continuation of application No. 18/160,219, filed on Jan. 26, 2023, now Pat. No. 11,880,936.

(51) Int. Cl.
| | |
|---|---|
| *G06T 17/00* | (2006.01) |
| *G06F 3/04815* | (2022.01) |
| *G06F 3/04842* | (2022.01) |
| *G06F 3/04886* | (2022.01) |
| *G10L 15/26* | (2006.01) |

(52) U.S. Cl.
CPC .......... *G06T 17/00* (2013.01); *G06F 3/04815* (2013.01); *G06F 3/04842* (2013.01); *G06F 3/04886* (2013.01); *G10L 15/26* (2013.01)

(58) Field of Classification Search
CPC . G06T 17/00; G06F 3/04815; G06F 3/04842; G06F 3/04886; G10L 15/26
See application file for complete search history.

(56) References Cited

U.S. PATENT DOCUMENTS

| | | | |
|---|---|---|---|
| 2011/0289406 A1* | 11/2011 | Wassingbo | G06F 3/0488 715/256 |
| 2012/0306767 A1 | 12/2012 | Campbell | |
| 2014/0039889 A1 | 2/2014 | Weeks et al. | |
| 2018/0307303 A1 | 10/2018 | Powderly et al. | |
| 2021/0407158 A1* | 12/2021 | Sen | G10L 15/26 |

* cited by examiner

*Primary Examiner* — William A Beutel
(74) *Attorney, Agent, or Firm* — DLA Piper LLP US

(57) ABSTRACT

A transcript of an audio conversation between multiple users (e.g., two users) is generated. The transcript is displayed in real time within a VR environment as the conversation takes place. A virtual selection tool is displayed within the VR environment to allow for a selection of different portions of the transcript. In addition, a virtual keyboard and or virtual panels with characters may be displayed and the virtual selection tool may be used to make selections from these displays as well. These selections are used to generate new text. The new text may form part of a user's notes of the conversation or an entry for a text field within the VR environment.

20 Claims, 15 Drawing Sheets

GENERATING AND DISPLAYING TEXT IN A VIRTUAL REALITY ENVIRONMENT

CROSS REFERENCE TO RELATED APPLICATIONS

This application is a Continuation Application of U.S. application Ser. No. 18/160,219 filed Jan. 26, 2023. The entirety of the above-listed application is incorporated herein by reference.

BACKGROUND

Virtual reality, augmented reality, and immersive reality (collectively referred to as "virtual reality" or "VR") are now at the frontier of the ongoing information technology revolution. While smaller portable screens, e.g., on smartphones and tablets, have dominated the exchange of information for the first decades of this century, VR headsets have been continually gaining traction. Compared to the two-dimensional screens where the user is always at a distance away from an environment being displayed, VR allows the user to be within the environment and interact with objects therein. VR therefore has an enormous potential to aid, for example, collaboration where team members at different locations can simultaneously interact with a three-dimensional design, education where manipulation friendly interactive environments are much richer than textbook pages, entertainment where the user is not just a distant observer but an active participant, and so on. And yet significant challenges remain for specific features within VR environments. For instance, one challenge has been entering text within a rendered environment, for which the existing solutions have proven to be unsatisfactory.

As such, a significant improvement in entering text within a VR environment is desired.

SUMMARY

Embodiments disclosed herein solve the aforementioned technical problems and may provide other technical solutions as well. In an example embodiment, a transcript of an audio conversation between multiple users (e.g., two users) is generated. The transcript is displayed in real time within a VR environment as the conversation takes place. A virtual selection tool is displayed within the VR environment to allow a selection of different portions of the transcript. In addition, a virtual keyboard and or virtual panels with characters may be displayed, and the virtual selection tool may be used to make selections from these displays as well. These selections—which may include, for example, words, sentences, and or phrases—are used to generate new text. The new text may form a user's notes of the conversation or an entry for a text field within the VR environment.

In an example embodiment, a method is provided. The method may include converting an audio signal comprising speech into text and displaying the converted text at a first staging area within the virtual reality environment. The method may also include displaying a selection tool within the virtual reality environment for selecting one or more portions of the text. The method may further include, in response to receiving a selection of a portion of the displayed text l, displaying newly generated text comprising the selected one or more portions of the text at a second staging area within the virtual reality environment.

In another example embodiment, a system is provided. The system may include a non-transitory storage medium storing computer program instructions and one or more processors configured to execute the computer program instructions to cause the system to perform operations. The operations may include converting an audio signal comprising speech into text and displaying the converted text at a first staging area within a virtual reality environment. The operations may also include displaying a selection tool within the virtual reality environment for selecting one or more portions of the text. The operations may further include, in response to receiving a selection of a portion of the displayed text, displaying newly generated text comprising the selected one or more portions of the text at a second staging area within the virtual reality environment.

DETAILED DESCRIPTION OF SEVERAL EMBODIMENTS

While VR environments have been effective in showing interactive objects, entering text within these environments has remained a challenge. A conventional two-dimensional display has an easier solution: a touch keyboard can be displayed at a fixed location on the screen and a user can make text entries using this keyboard. With VR, any text entry mechanism has to be within the field of view, has to move with the user's head movement, and or not obstruct the main view, thereby creating a significantly harder challenge compared to the simple, two-dimensional keyboard entry solutions.

One or more embodiments disclosed herein allow the user to enter text using different types of mechanisms suited for a VR environment. A first entry mechanism is a selection from a transcribed conversation. For instance, a current user (e.g., an expert at a customer service center) may be in a telephonic conversation with a remote user (e.g., a customer calling in with an issue), and the conversation may be transcribed in real time and displayed within the VR environment. A selection tool (e.g., a ray interactor) may be displayed to allow the current user to select portions of the real-time transcription as notes. Additionally, a virtual keyboard and or one or more virtual panels may be displayed to expand the selection options. Selections from these expanded options may be used to augment the already entered text. Furthermore, a list of predetermined words may be provided for selection. These predetermined words may not necessarily be spoken in the conversation, but instead provided by an artificial intelligence (AI) pipeline to be salient to the conversation. The predetermined words may further be based on the current user's preferences. To avoid obstructing the main view, the text entry mechanisms may be minimized while still allowing the current user to use them.

Figure 1:
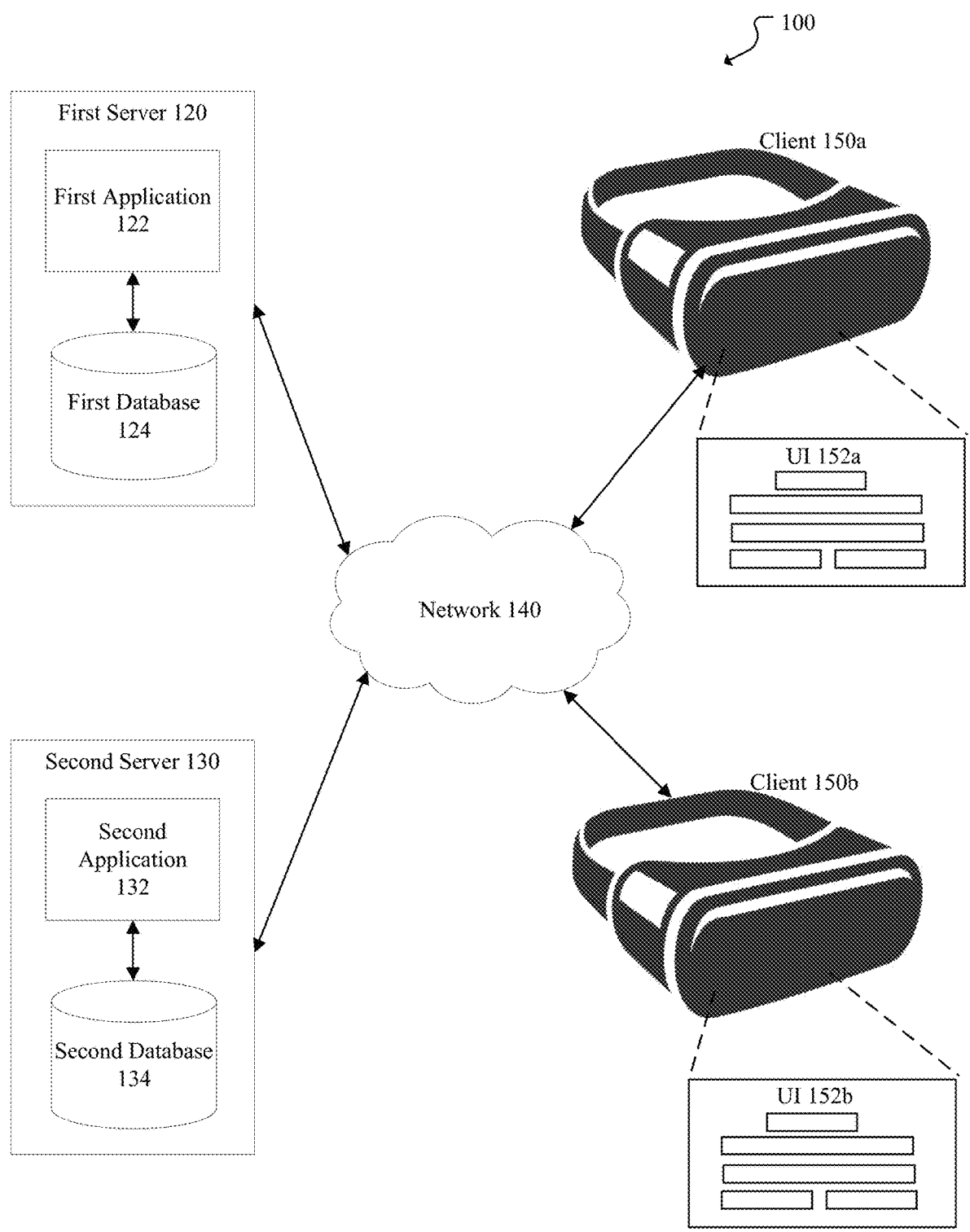
FIG. 1 shows an example of a system configured for generating and displaying text in a VR environment based on the principles disclosed herein.

FIG. 1 shows an example of a system 100 configured for generating and displaying text in a VR environment based on the principles disclosed herein. It should be understood that the components of the system 100 shown in FIG. 1 and described herein are merely examples and systems with additional, alternative, or fewer number of components should be considered within the scope of this disclosure.

As shown, the system 100 comprises client devices 150a, 150b (collectively referred to herein as "client devices 150") and first and second servers 120, 130 interconnected through a network 140. The first server 120 hosts a first application 122 and a first database 124 and the second server 130 hosts a second application 132 and a second database 134. The client devices 150a, 150b may include VR headsets. The client devices 150a, 150b have user interfaces 152a, 152b, respectively, (collectively referred to herein as "user interfaces (UIs) 152") which may be used to communicate with the applications 122, 132 using the network 140. For example, communication between the different components of the system 100 is facilitated by one or more application programming interfaces (APIs). APIs of system 100 may be proprietary and or may include such APIs as Amazon® Web Services (AWS) APIs or the like. The network 140 may be the Internet and or other public or private networks or combinations thereof. The network 140 therefore should be understood to include any type of circuit switching network, packet switching network, or a combination thereof. Non-limiting examples of the network 140 may include a local area network (LAN), metropolitan area network (MAN), wide area network (WAN), and the like.

Client devices (i.e., VR devices) 150 may include any device configured to present user interfaces (UIs) 152 and receive user inputs. The UIs 152 are presented within a field of view of the VR devices 150. In an example use case, VR device 150a is used by an expert at a customer care center and device 150b is used by a customer connected to the expert for resolving an issue. Each of the expert and the customer may be able to see avatars of each other in the corresponding UIs 152. Furthermore, in accordance with the disclosed principles, the expert may be able to see a runtime transcript of the spoken conversation in the UI and perform a selection of one or more portions of the conversation to generate notes, a summary, etc. The first application 122 and the second application 132 may facilitate one of more functionalities, for example, the applications 122, 132 may facilitate communication, transcription, an AI pipeline, and or other functionality associated with the text generation and display within the UIs 152. The databases 124, 134 may store computer program codes and or other data to facilitate the functionality of the corresponding applications 122, 132.

First server 120, second server 130, first database 124, second database 134, and client devices 150 are each depicted as single devices for ease of illustration, but those of ordinary skill in the art will appreciate that first server 120, second server 130, first database 124, second database 134, and or client devices 150 may be embodied in different forms for different implementations. For example, any or each of first server 120 and second server 130 may include a plurality of servers or one or more of the first database 124 and second database 134. Alternatively, the operations performed by any or each of first server 120 and second server 130 may be performed on fewer (e.g., one or two) servers. In another example, a plurality of client devices 150 may communicate with first server 120 and/or second server 130. A single user may have multiple client devices 150, and/or there may be multiple users each having their own client devices 150.

FIGS. 2-8, described below, show different example displays generated in the VR environment, using one or more embodiments disclosed herein. It should be understood that the displays and their portions are for illustrative purposes only and therefore should not be considered limiting. Any type of VR display providing the described functionality should be considered within the scope of this disclosure. The example displays may be generated by the VR devices 150.

Figure 2A:
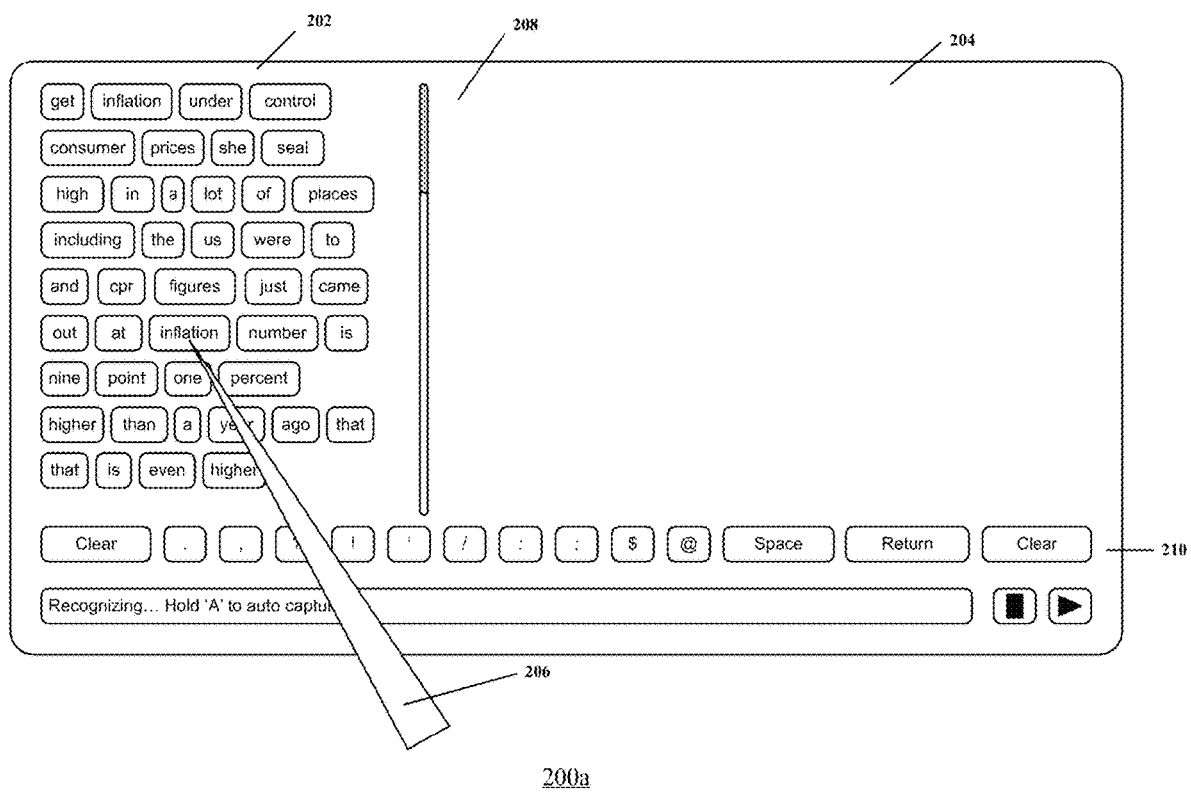
FIGS. 2A-2C show example displays within the VR environment based on the principles disclosed herein.
Figure 2B:
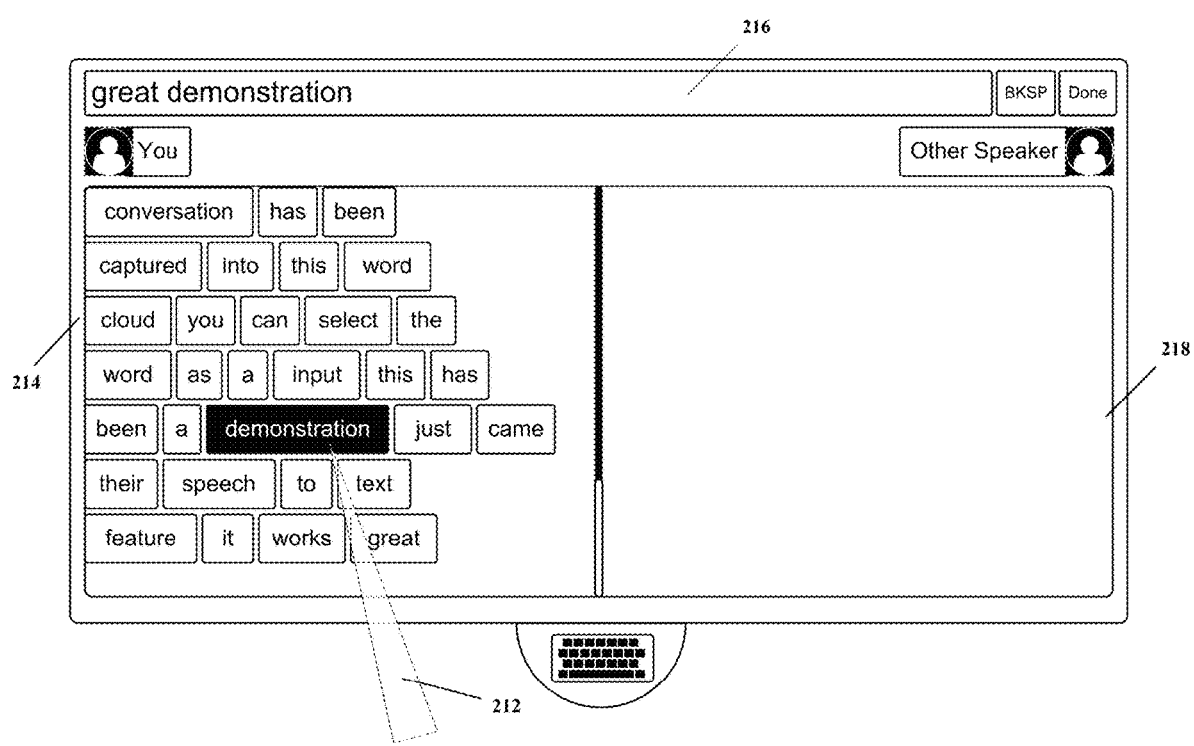
Figure 2C:
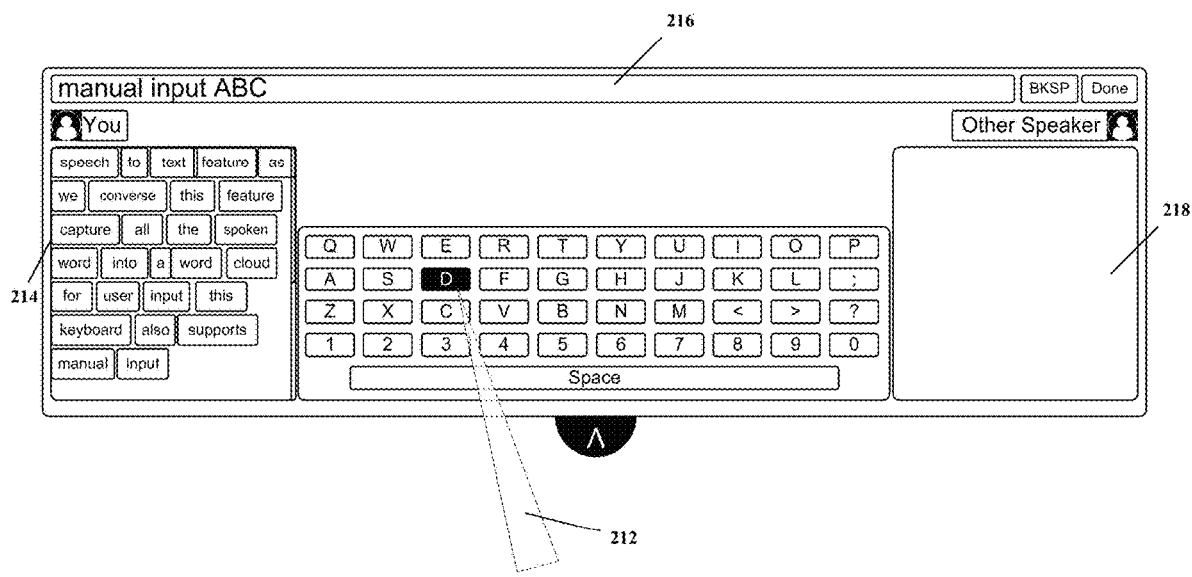

FIGS. 2A-2C show example displays 200a-200c within the VR environment based on the principles disclosed herein. The display 200a in FIG. 2A shows an example note entry mode, where the portions of displayed text are selected to generate notes. The display 200a may be generated using a speech to text feature. For instance, the display 200a may be used for transcribing a two-way phone conversation and taking notes therefrom. An example use case may be a call center where the first participant of the call is a customer (referred to as a remote user), and the second participant is an expert support personnel (referred to as a current user). At a first staging area 202, text transcription of the call is shown. Furthermore, a virtual selector 206 (e.g., a ray interactor) is shown on the display 200a, which can then be used to select portions of the transcribed text at the first staging area 202. That is, a user wearing a VR headset will be able to move the virtual selector around the display and perform a gesture (e.g., a virtual tap/press) to select a portion of the transcribed text. The portion can be, for example, a letter, word, phrase, sentence, paragraph, or the entire text. The selected portion of the text is then displayed at a second staging area 204. As seen in the displayed text 208 in the second staging area 204, the selected portions of the transcribed text include "still high" and another portion of the transcribed text "inflation" is being selected by selector 206. The displayed text 208 at the second staging area 204 may therefore be the notes that the expert support personnel takes during the call with the customer. In addition to the staging areas 202, 204, the display 200a may further have a control bar (or control panel) 210 to edit, revise, and or other modify the text in one or more of the first and the second staging areas 202, 204.

The display 200b in FIG. 2B shows another example of a note entry mode during a two-way conversation between the current user and the remote user. Particularly, transcript of conversation by the current user is shown at a staging area 214 and transcript of conversation by the remote user may be shown at a staging area 218. A virtual selector 212 can be used to select words from any of the staging areas 214, 216 to populate a note window 216.

The display 200c in FIG. 2C shows yet another example of a note entry mode during a two-way conversation between the current user and the remote user. The note entry mode shown in FIG. 2C is particularly configured for manual input to the note window 216. To that end, a virtual keyboard 220 is provided in addition to the staging areas 214, 218. The virtual selector 212 can be used to virtually type on the virtual keyboard should the words from the staging areas 214, 218 be insufficient.

Figure 3:
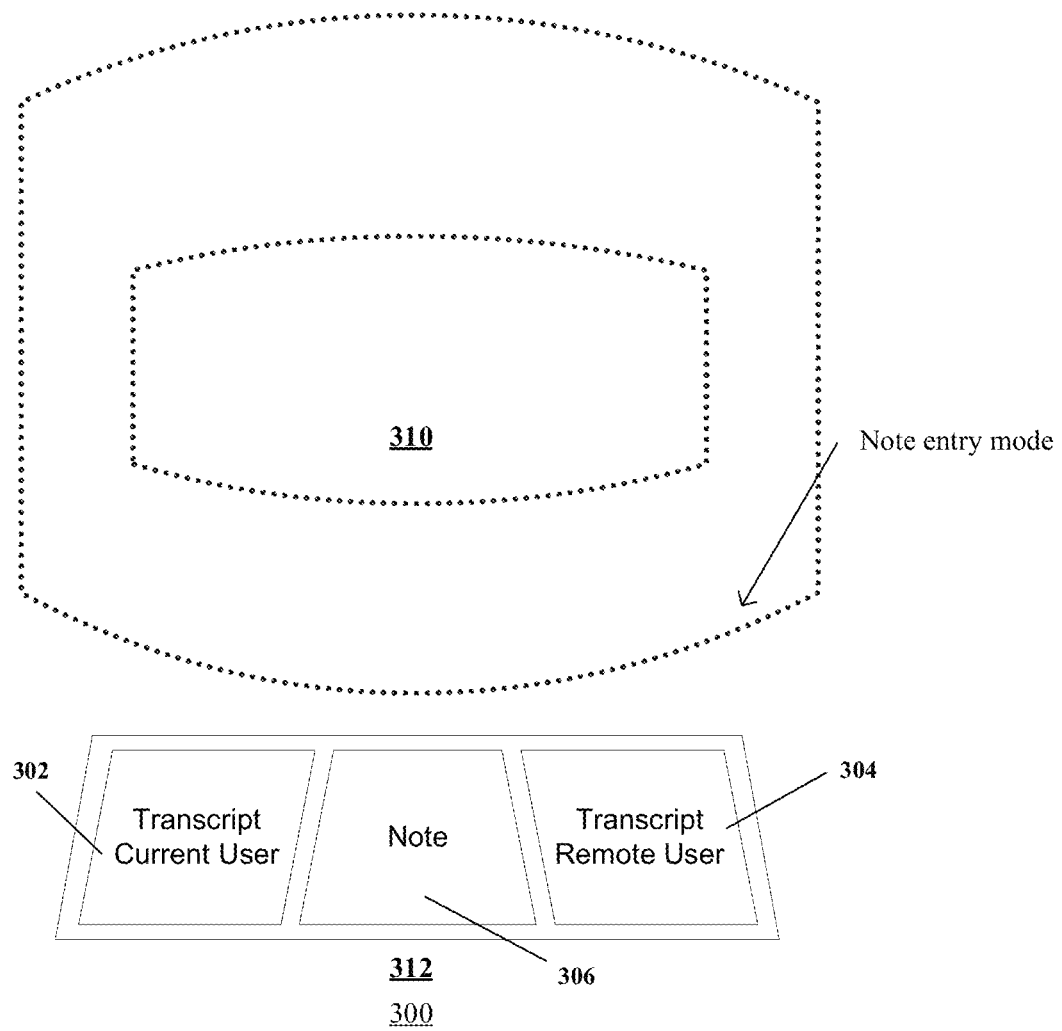
FIG. 3 shows an example display within the VR environment based on the principles disclosed herein.

FIG. 3 shows an example display 300 within the VR environment based on the principles disclosed herein. The display 300 shows another example of a note entry mode during a conversation between the current user and the remote user. Particularly, the display 300 shows a panel 312 including a first staging area 302 containing the transcript of the current user's speech, a second staging area 304 containing the transcript of the remote user's speech, and a third staging area 306 containing the note that is being generated during the conversation. The illustrated display 300 also includes other objects 310, such as a scene, a three-dimensional interactive design, etc. Within the illustrated display 300, the current user can select portions of the text in the transcripts at one or more of the first and second staging areas 302, 304. The selection may be performed using a virtual selector (not shown). The selected portions can include letters, words, phrases, sentences, paragraphs, or the entirety of the displayed transcript.

Figure 4:
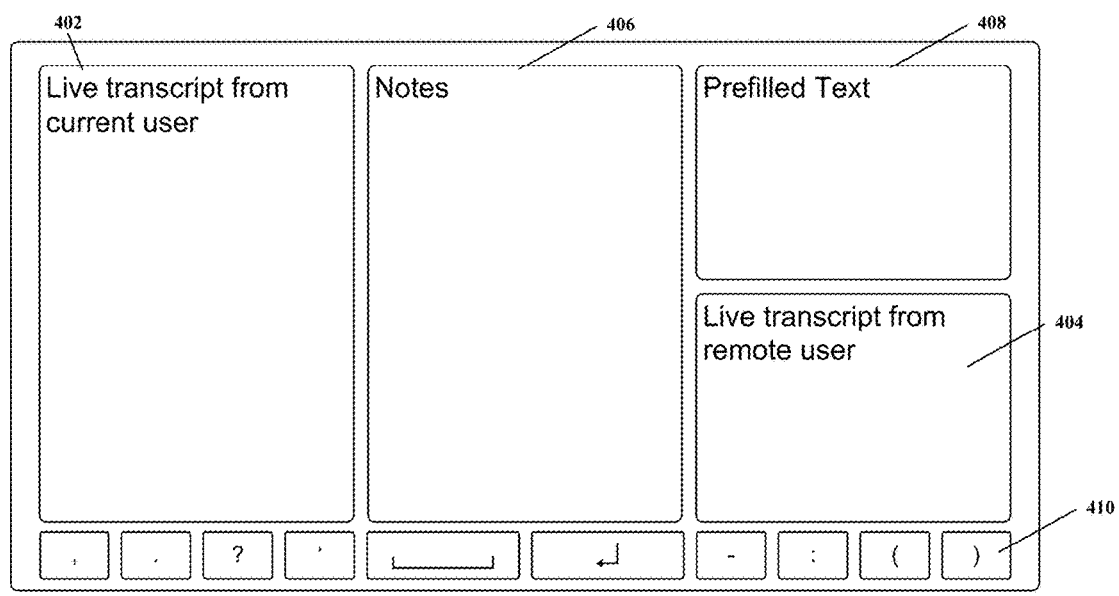
FIG. 4 shows an example display within the VR environment based on the principles disclosed herein.

FIG. 4 shows an example display 400 within the VR environment based on the principles disclosed herein. The display 400 shows yet another example of a note entry mode during a conversation between the current user and the remote user. Particularly, the illustrated display 400 shows a first staging area 402 containing the transcript of the current user's speech, a second staging area 404 containing the transcript of the remote user's speech, and a third staging area 406 containing the note that is being generated during the conversation. The illustrated display 400 also includes another staging area 408 containing prefilled text. The prefilled text may include, for example, commonly used words or phrases, the current user's preferred words or phrases, and the like, that may aid the current user to take notes in the third staging area 406. Additionally or alternatively, the prefilled text may include text generated by an AI pipeline, where the text may not have been necessarily uttered during the conversation, yet salient to the conversation. The AI pipeline may include, for example, natural language processors, classifiers, etc.

The illustrated display 400 also includes a panel 410 containing frequently used symbols, punctuations, and the like, that too may be selected during the generation of the note. Within the display 400, the current user can select portions of the text in the transcripts at one or more of the staging areas 402, 404, 408 and the panel 410. The selection may be performed using a virtual selector (not shown). The selected portions can include letters, words, phrases, sentences, paragraphs, or the entirety of the displayed transcript. Therefore, notes can be taken efficiently during a conversation between the current user and the remote user using the display 400.

Figure 5A:
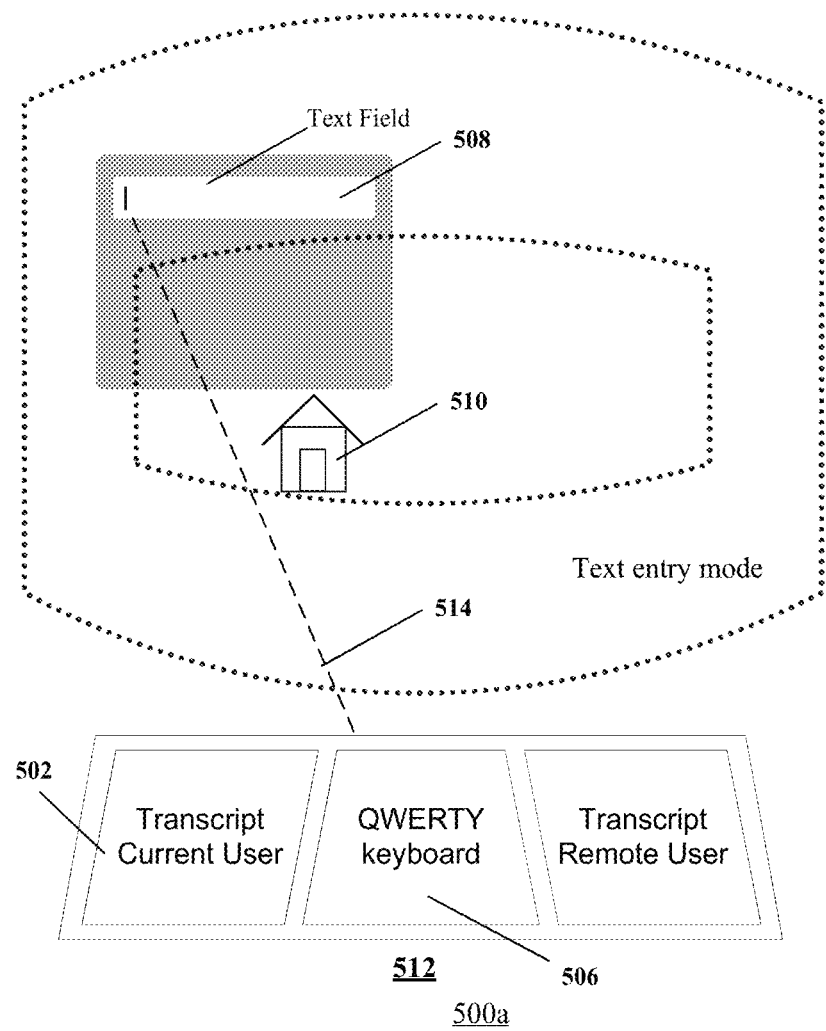
FIGS. 5A-5C show example displays within the VR environment based on the principles disclosed herein.
Figure 5B:
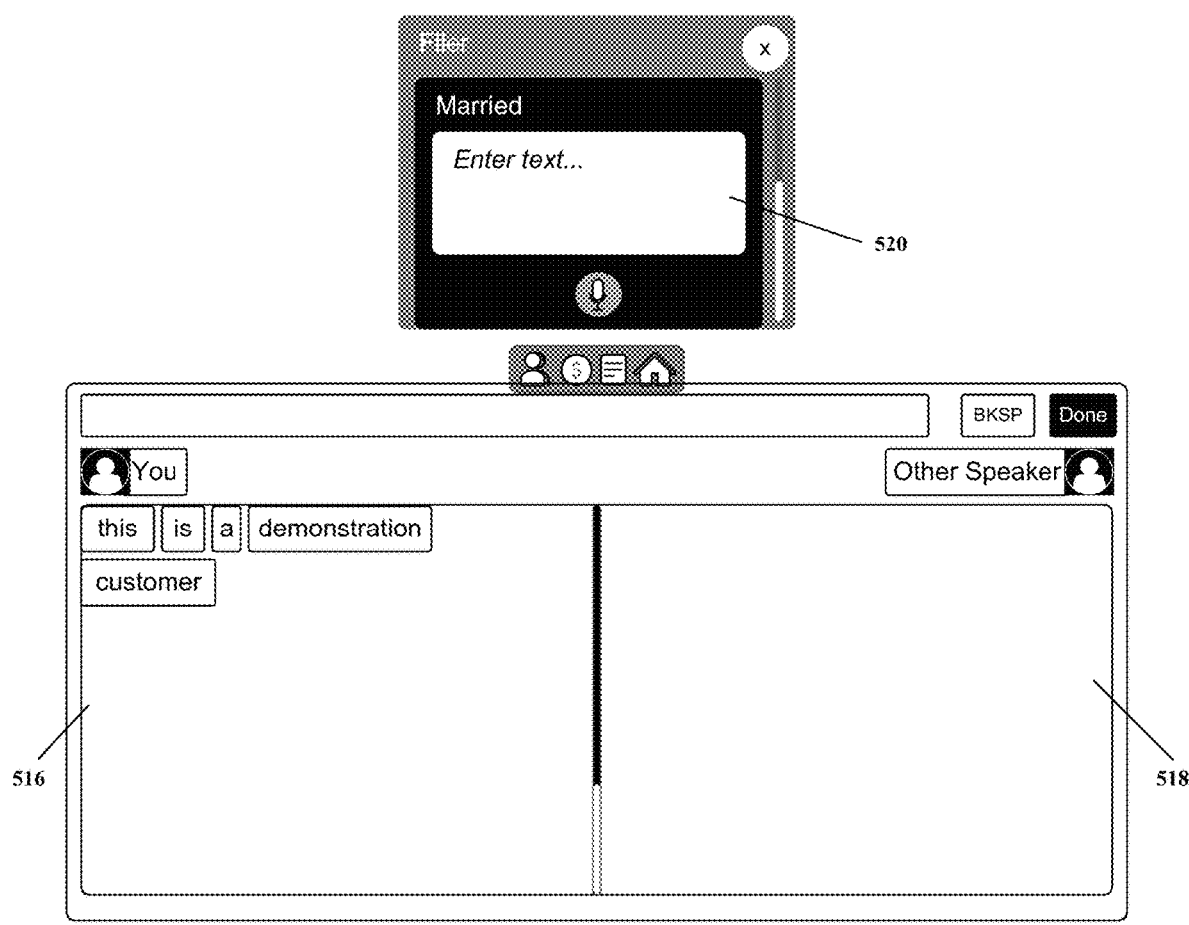
Figure 5C:
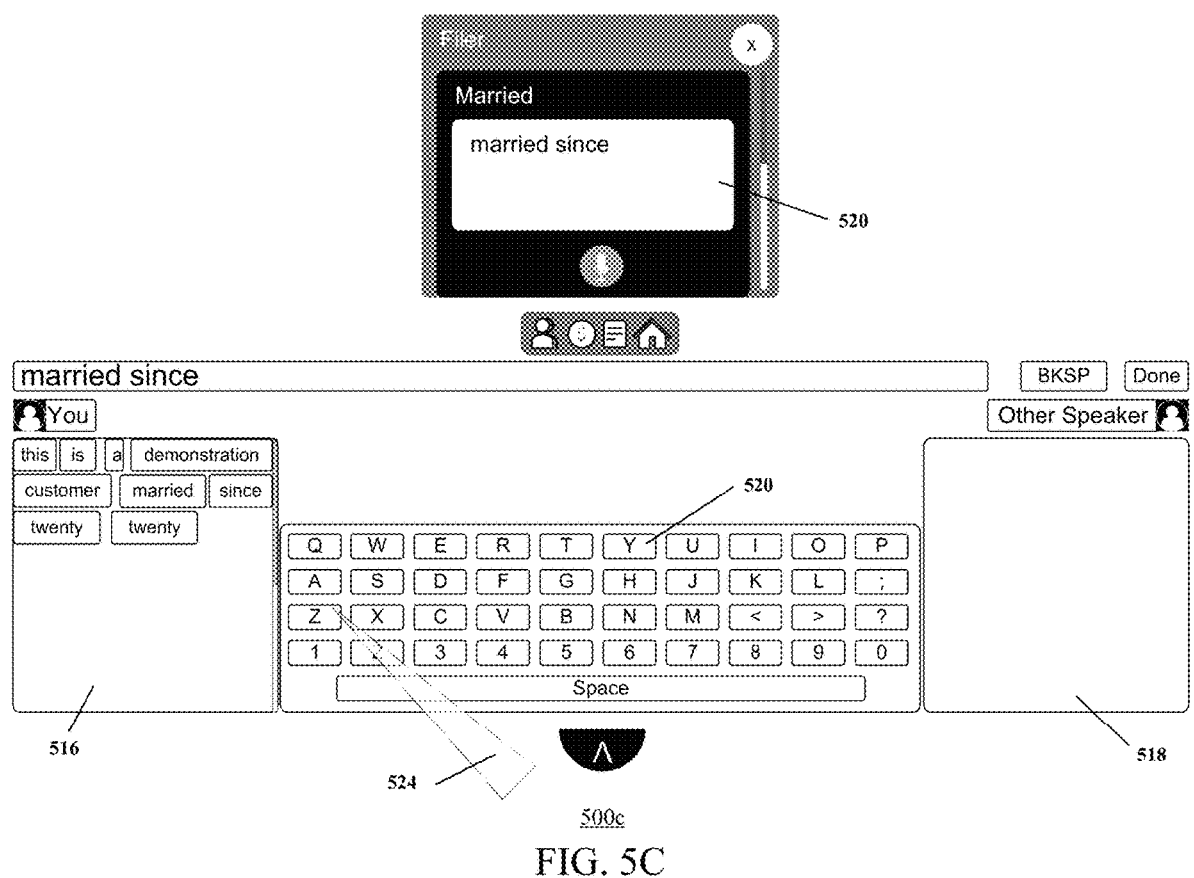

FIGS. 5A-5C show example displays 500a-500c within the VR environment based on the principles disclosed herein. The display 500a shows an example of a text entry mode, where the current user can manually enter text. As shown, a bottom panel 512 includes a first staging area 502 with the speech to text transcript of the current user and a second staging area 504 of a remote user. In addition, the bottom panel 512 includes a virtual keyboard (e.g., a QWERTY keyboard) 506 that is used to enter text within a text field 508 shown on the display 500a. For example, the display 500a may be shown in both the current user's and the remote user's headsets and both users may be viewing the same VR environment, e.g., the same display 500a. In the illustrated example, an object 510 displayed is within the common VR environment. The current user can then use a virtual selector 504 to point to the text field 508 and use the virtual keyboard 506 to enter text in the text field 508. The virtual selector 504 is used to navigate to a field where text can be typed using the virtual keyboard 506. Alternatively, the virtual selector 514 can be used to select text from one or more of the first and second staging areas 502, 504 and drag the selected text to the text field 508. Therefore, any type of text typing and/or selecting mechanism for an entry into the text field 508 should be considered within the scope of this disclosure.

The display 500b in FIG. 5B shows an example of a text entry mode where the current user can enter a text in text field 520 within the VR environment. The text can be selected from a staging area 516 containing transcript of conversation of the current user and or staging area 518 containing transcript of conversation of the remote user. The display 500c in FIG. 5C shows another example of text entry mode, where the current user can enter a text in the text field 520. In the display 500c, the user can not only select the text from the staging areas 516, 518, but also can use a virtual pointer 524 to type on a virtual keyboard 520 to manually enter text in the text field 520.

Figure 6:
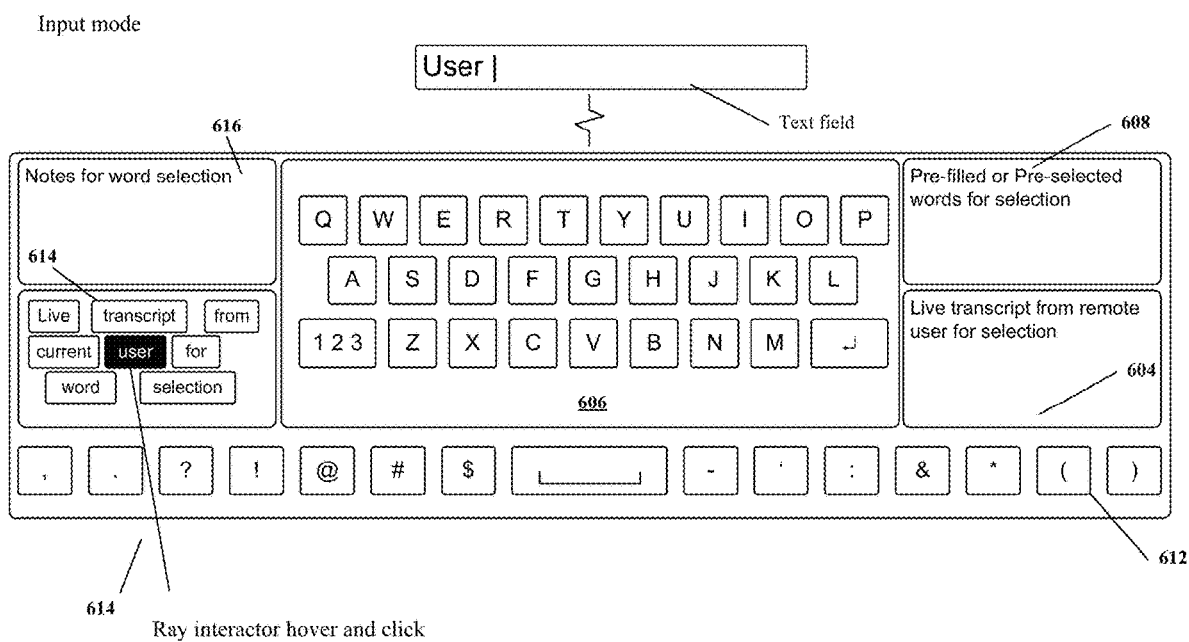
FIG. 6 shows an example display within the VR environment based on the principles disclosed herein.

FIG. 6 shows an example display 600 within the VR environment based on the principles disclosed herein. The display 600 shows another example of a text entry mode, where the current user can manually enter text. As shown, the display 600 includes a staging area 602 with the speech to text transcription of the current user, a staging area 604 with the speech to text transcription of remote user, a staging area 608 with pre-filled words for selection, and a staging area 616 with notes for word selection. The prefilled text may include text generated by an AI pipeline, where the text may not have been necessarily uttered during the conversation, yet salient to the conversation. The AI pipeline may include, for example, natural language processors, classifiers, etc. Therefore, text for a text entry field 610 can be selected from any of the staging areas 602, 604, 608, 616 using a virtual selector 614. Furthermore, the illustrated display 600 includes a virtual keyboard 606 (e.g., a QWERTY keyboard) that the current user may use to manually type the text into the text entry field 610. The manual typing, in some examples, may include using the virtual selector 614 to select the letters in the virtual keyboard 606. Additional selections can be made from a symbol panel 612 that includes the commonly used symbols and the punctuation marks.

Figure 7:
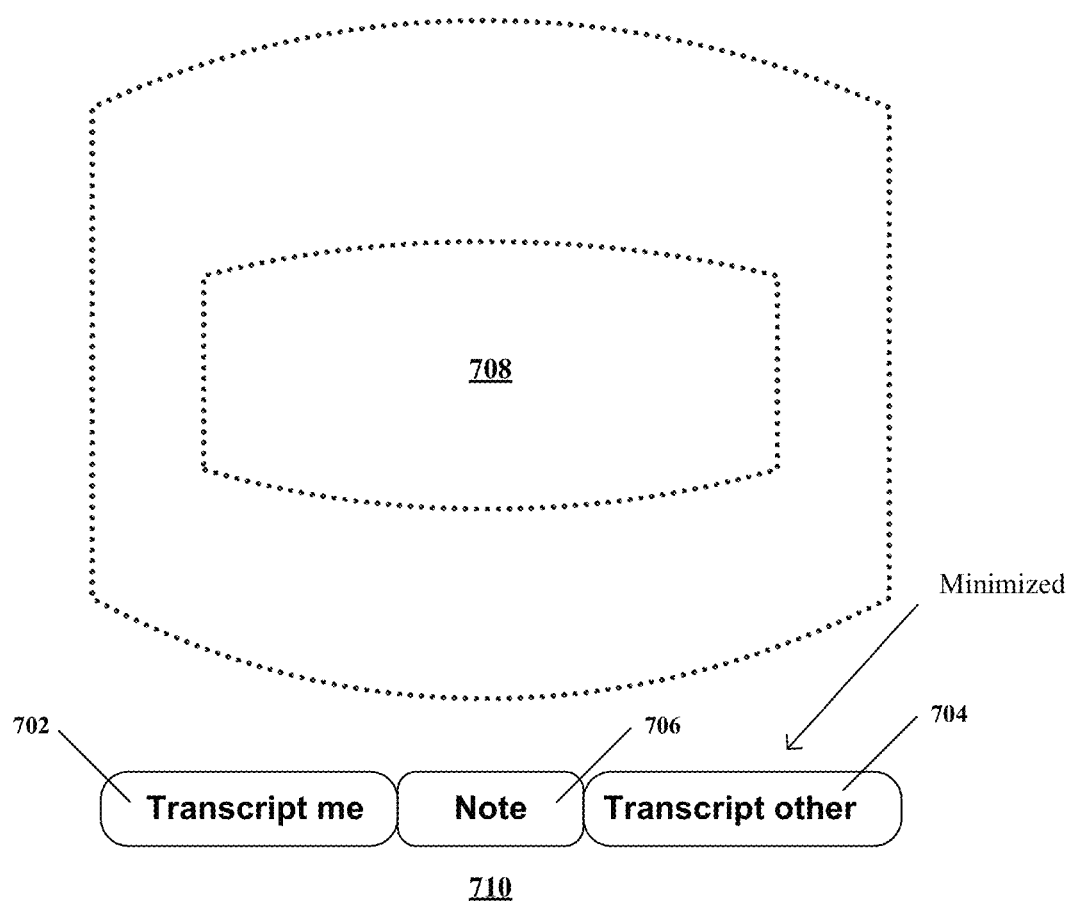
FIG. 7 shows an example display within the VR environment based on the principles disclosed herein.

FIG. 7 shows an example display 700 within the VR environment based on the principles disclosed herein. The display 700 is an example of a minimized mode, showing text entry areas as a minimized panel 710. Particularly, the illustrated minimized panel 710 includes a first staging area 702 containing speech transcription of the current user, a second staging area 704 containing speech transcript of the remote user, and a third staging area 706 to enter notes. All of the staging areas 702, 704, 706 may therefore show a minimal amount of text, leaving a large portion 708 of the display for other objects in the VR environment. The current user, however, may maximize the panel 710 may using the virtual selector and or any other suitable command.

Figure 8:
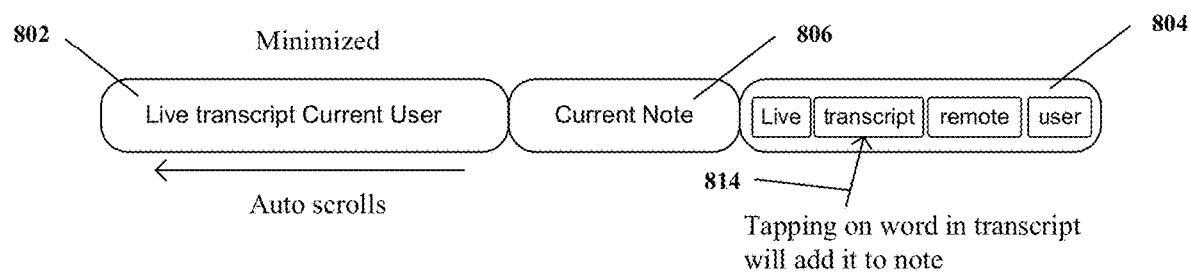
FIG. 8 shows an example display within the VR environment based on the principles disclosed herein.

FIG. 8 shows an example display 800 within the VR environment based on the principles disclosed herein. The display 800 is another example of minimized mode. The display 800 includes a first staging area 802 containing the speech transcription of the current user, a second staging area 804 containing the speech transcription of the remote user, and a third staging area 806 for the current note being entered. The first and the second staging areas 802, 804 can automatically scroll across as the current user and the remote user are taking. In the minimized mode as well, the current user can use a virtual selector 814 to select portions of the text in one or more of the first and second staging areas 802, 804 and add the selected portion to the note in the third staging area 806.

One or more embodiments disclosed herein can be used for various applications. For example, the session data of the conversation in the VR environment can be rendered in a different interface for further analysis, e.g., to generate a summary of the session data.

Figure 9:
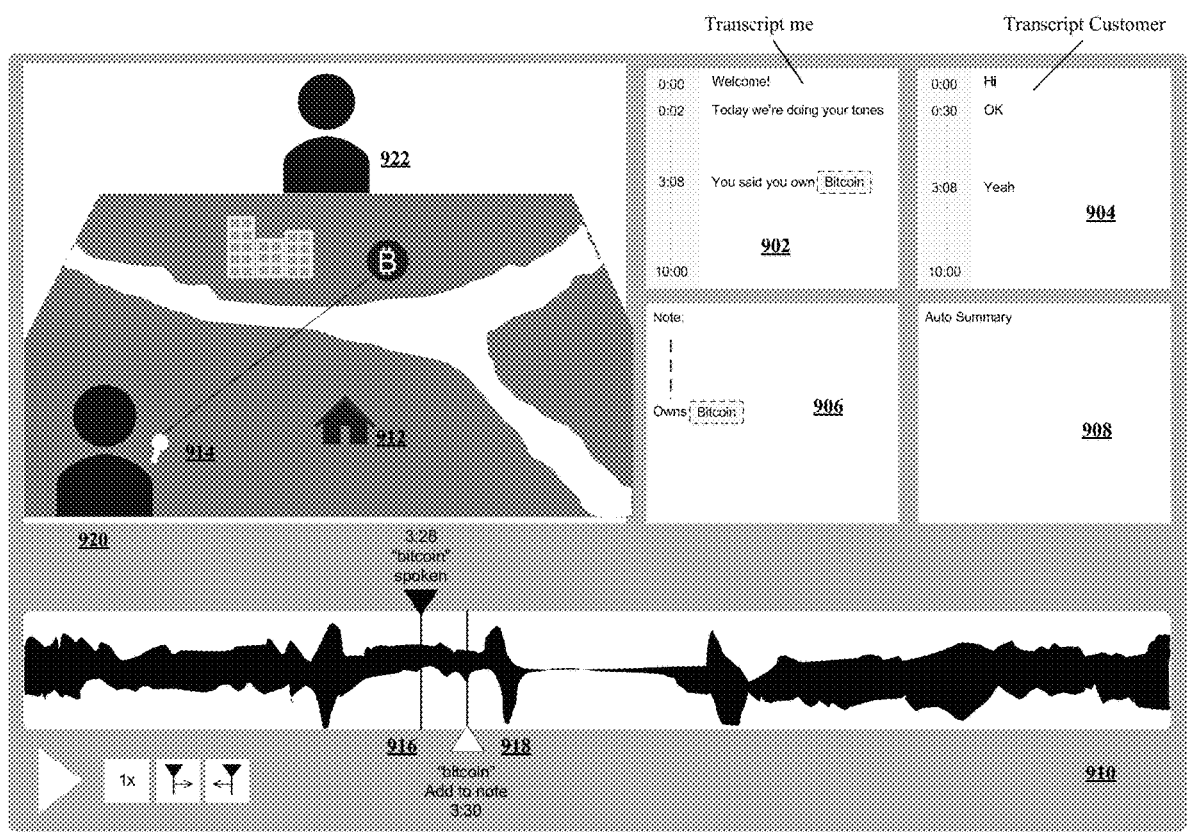
FIG. 9 shows an example interface for analyzing session data based on the principles disclosed herein.

FIG. 9 shows an example interface 900 for analyzing session data based on the principles disclosed herein. It should be understood that the interface 900 is an example and should not be considered limiting. Any other type of interface allowing for session data analysis should be considered within the scope of this disclosure.

As shown, the interface 900 includes a window 902 showing a time stamped speech transcription for the current user. The portions selected for or relevant for the note (as shown, the word "bitcoin") may be highlighted. Another window 904 shows a time stamped speech transcription of the remote user. The portions selected for the note or relevant for the note may be highlighted (as shown, the remote user is confirming that he/she owns bitcoin). Window 906 shows a note generated by the current user during the conversation. Window 908 shows an auto summary of the session. The auto summary can include tag words, most repeated words, an output based on natural language processing, and or any other type of automatically generated summary of the session.

Another window 906 shows the video based on the session data. As shown, the video 902 includes an avatar 920 for the current user and an avatar 922 for the remote user. The avatars 920, 922 interact with each other during the conversation where each user sees the other user's avatar. Here, the avatar 920 of the current user uses a virtual selector 914 to select bitcoin for adding it to the notes and or to a text field.

The illustrated interface 900 further includes an audio timeline 910 of the conversation. Within the audio timeline 910, portions corresponding to the text in the note may be tagged. For example, a first tag 916 shows a location in the audio timeline 910 where the word "bitcoin" was spoken and a second tag 918 shows a location where the word "bitcoin" was added to the note.

Therefore, using the interface 900, the entirety of the virtual session data can be analyzed, and its summary can be generated. Furthermore, the interface 900 may function as an indexed record of the virtual session, i.e., salient portions of the virtual sessions may be tagged for easy access.

The illustrated interface 900 is just one example of using the virtual session data generated using the one or more embodiments disclosed herein. Other usages of the virtual session data may include automatic generation of photographic highlights. The photographic highlights may photographs corresponding to salient portions of the virtual session, e.g., when an important part of the conversation took place, when something was accomplished, when a problem was solved, etc. Additionally or alternatively, video highlight reels may be generated. These highlights may stitch together the video clips of salient portions of conversation.

Figure 10:
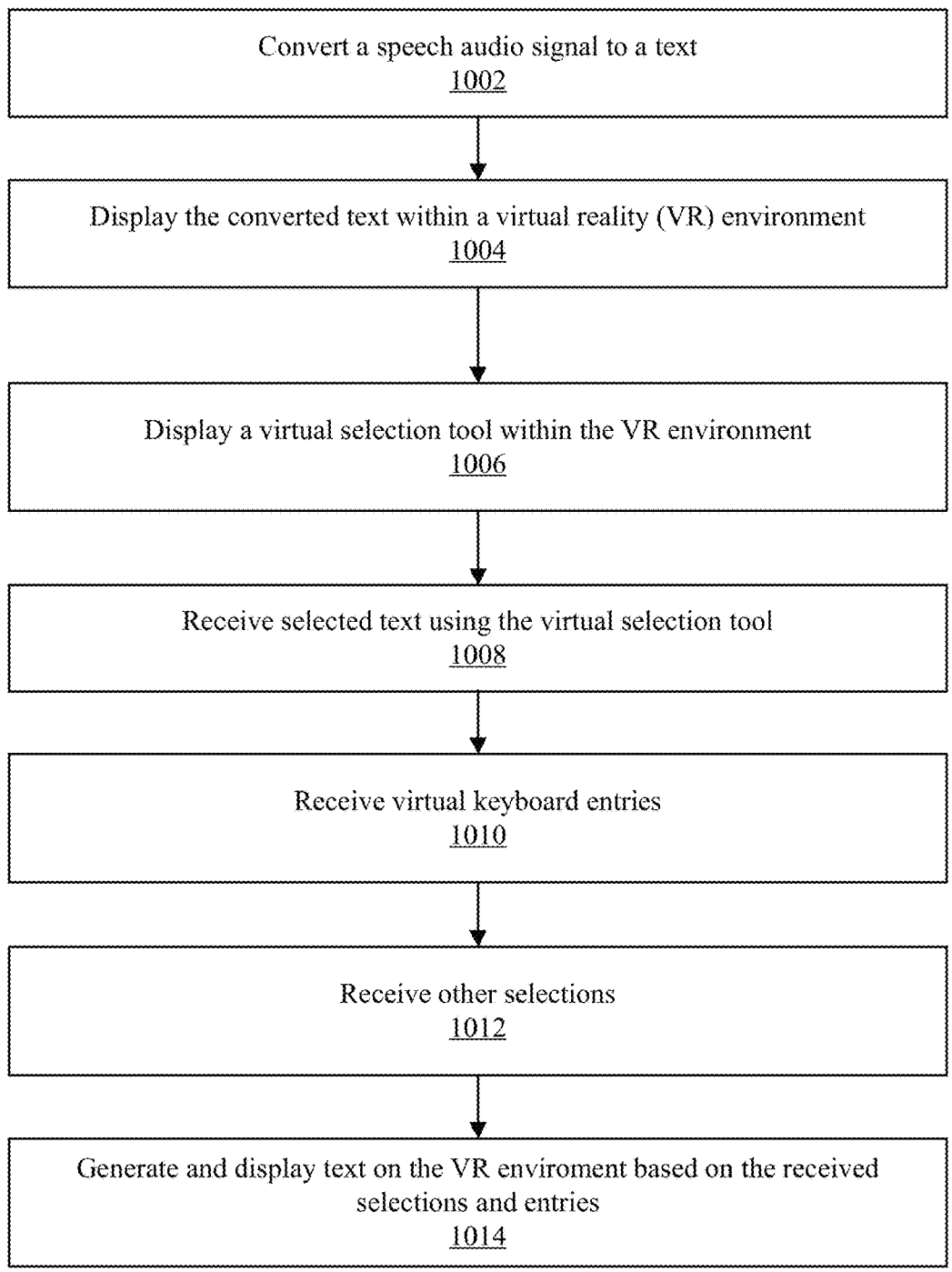
FIG. 10 shows an example method of entering text within the VR environment based on the principles disclosed herein.

FIG. 10 shows an example method 1000 of entering text within the VR environment based on the principles disclosed herein. One or more steps of the method 1000 may be performed by one or more components of the system 100 shown in FIG. 1. It should be understood that the shown steps are merely exemplary and should not be considered limiting. Furthermore, the sequence of the steps is exemplary, and it too should not be considered limiting. Therefore, methods with additional, alternative, fewer, or differently sequenced steps should also be considered within the scope of this disclosure.

The method 1000 starts at step 1002, where a speech audio signal is converted to text. The speech audio signal may contain a conversation between a current user (e.g., an expert at a customer service center) and a remote user (e.g., a customer calling for expert help). The speech audio signal may be converted to text using any type of speech to text transcription technique known in the art.

At step 1004, the converted text is displayed within a VR environment. For example, the converted text is displayed at different staging areas within the VR environment; for example, the converted text containing the current user's speech may be displayed at a first staging area and the converted text containing the remote user's speech may be displayed at a second staging area.

At step 1006, a virtual selection tool is displayed within the VR environment. The virtual selection tool may include, for example, a ray interactor that can be used to hover over the displayed text and select portions therefrom. At step 1008, text selected using the virtual selection tool may be received. The selected text may comprise different portion of the displayed text (i.e., the transcription of the speeches).

At step 1010, virtual keyboard entries may be received. That is, the VR environment may display a virtual keyboard, and the user may use the virtual selection tool (and or any other mechanism) to interact with the virtual keyboard. The entries from the virtual keyboard may augment and or revise any selected text. Alternatively, the entries from the virtual keyboard may be entries for different fields displayed within the VR environment. At step 1012, other selections may be received. The other selections may include special symbols and punctuations that are selected from a corresponding panel and or text entered using any other technology (e.g., using hand gesture).

At step 1014, text is generated and displayed on the VR environment based on the received selections and entries. The text may be displayed in a corresponding staging area. The text may comprise a summary of the conversation, notes taken by the current user during the conversation, and or any other record of the conversation.

Figure 11:
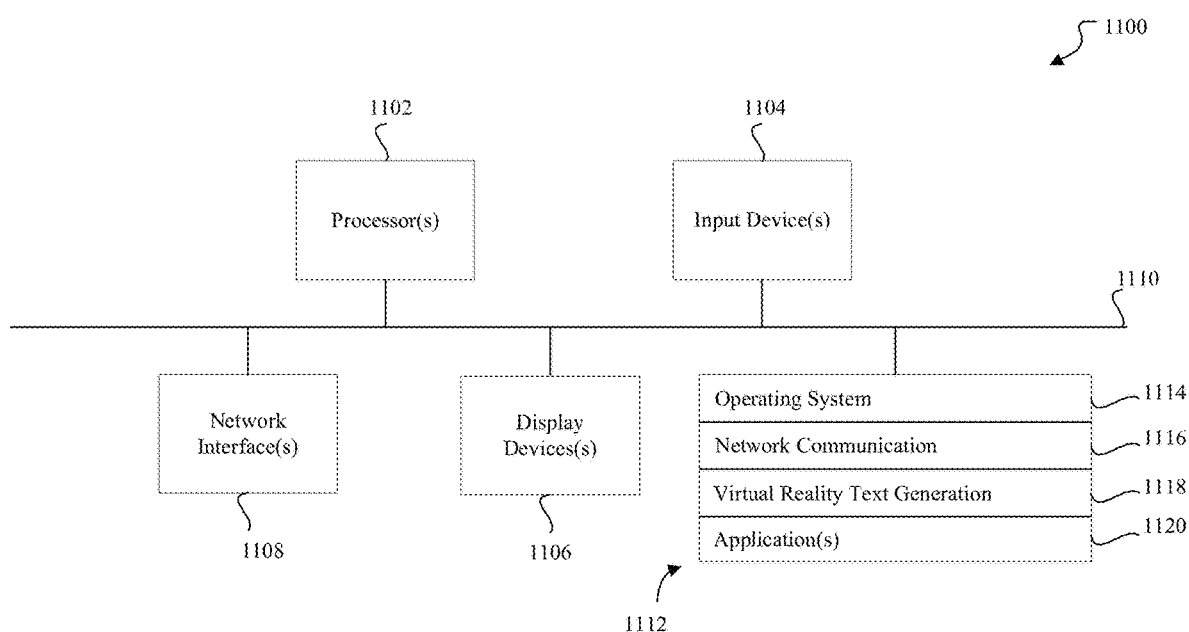
FIG. 11 shows a block diagram of an example computing device that implements various features and processes based on the principles disclosed herein.

FIG. 11 shows a block diagram of an example computing device 1100 that implements various features and processes, based on the principles disclosed herein. For example, computing device 1100 may function as first server 120, second server 130, client 150a, client 150b, or a portion or combination thereof in some embodiments. The computing device 1100 also performs one or more steps of the method 1000. The computing device 1100 is implemented on any electronic device that runs software applications derived from compiled instructions, including without limitation personal computers, servers, smart phones, media players, electronic tablets, game consoles, email devices, VR headsets, etc. In some implementations, the computing device 1100 includes one or more processors 1102, one or more input devices 1104, one or more display devices 1106, one or more network interfaces 1108, and one or more computer-readable media 1112. Each of these components is coupled by a bus 1110.

Display device 1106 includes any display technology, including but not limited to display devices using Liquid Crystal Display (LCD) or Light Emitting Diode (LED)

technology. Processor(s) 1102 uses any processor technology, including but not limited to graphics processors and multi-core processors. Input device 1104 includes any known input device technology, including but not limited to a keyboard (including a virtual keyboard), mouse, track ball, and touch-sensitive pad or display. Bus 1110 includes any internal or external bus technology, including but not limited to ISA, EISA, PCI, PCI Express, USB, Serial ATA or FireWire. Computer-readable medium 1112 includes any non-transitory computer readable medium that provides instructions to processor(s) 1102 for execution, including without limitation, non-volatile storage media (e.g., optical disks, magnetic disks, flash drives, etc.), or volatile media (e.g., SDRAM, ROM, etc.).

Computer-readable medium 1112 includes various instructions 1114 for implementing an operating system (e.g., Mac OS®, Windows®, Linux). The operating system may be multi-user, multiprocessing, multitasking, multi-threading, real-time, and the like. The operating system performs basic tasks, including but not limited to: recognizing input from input device 1104; sending output to display device 1106; keeping track of files and directories on computer-readable medium 1112; controlling peripheral devices (e.g., disk drives, printers, etc.) which can be controlled directly or through an I/O controller; and managing traffic on bus 1110. Network communications instructions 1116 establish and maintain network connections (e.g., software for implementing communication protocols, such as TCP/IP, HTTP, Ethernet, telephony, etc.).

Virtual reality text generation instructions 1118 include instructions that implement the disclosed process for generating text in a VR environment based on the speech to text transcriptions of the multiple users.

Application(s) 1120 may comprise an application that uses or implements the processes described herein and/or other processes. The processes may also be implemented in the operating system.

The described features may be implemented in one or more computer programs that may be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment. In one embodiment, this may include Python. The computer programs therefore are polyglots.

Suitable processors for the execution of a program of instructions may include, by way of example, both general and special purpose microprocessors, and the sole processor or one of multiple processors or cores, of any kind of computer. Generally, a processor may receive instructions and data from a read-only memory or a random access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination thereof. The components of the system may be connected by any form or medium of digital data communication such as a communication network. Examples of communication networks include, e.g., a telephone network, a LAN, a WAN, and the computers and networks forming the Internet.

The computer system may include clients and servers. A client and server may generally be remote from each other and may typically interact through a network. The relationship of client and server may arise by virtue of computer programs running on the respective computers and having a client-server relationship to each other.

One or more features or steps of the disclosed embodiments may be implemented using an API. An API may define one or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. A method performed by a processor in a virtual reality environment supporting a two-way audio communication between a first user and a second user, said method comprising:
   converting, in real-time, audio signals comprising speeches of the first user and the second user into text;
   displaying a first text of speech of the first user within the virtual reality environment;
   displaying a second text of speech of the second user within the virtual reality environment;
   displaying a selection tool within the virtual reality environment for selecting one or more portions of the first text and one or more portions the second text; and
   in response to receiving a selection of the one or more portions of the first text and the one or more portions of the second text, displaying a newly generated text comprising the selected one or more portions of the first text and the selected one or more portions of the second text within the virtual reality environment.

2. The method of claim 1, further comprising:
   displaying a virtual keyboard within the virtual reality environment;
   receiving a selection of one or more keys of the virtual keyboard; and
   augmenting the newly generated text based on the selection of the one or more keys of the virtual keyboard.

3. The method of claim 1, further comprising:
   displaying a virtual keyboard within the virtual reality environment;
   receiving a selection of one or more keys of the virtual keyboard; and
   populating a text entry field based on the selection of the one or more keys of the virtual keyboard.

4. The method of claim 1, further comprising:
   displaying a virtual panel with keys with special characters and punctuation marks within the virtual reality environment;
   receiving a selection of one or more keys of the virtual panel; and
   augmenting the newly generated text based on the selection of the one or more keys of the virtual panel.

5. The method of claim 1, further comprising:
   displaying predetermined text in another staging area;
   receiving a selection of one or more portions of the predetermined text; and
   augmenting the newly generated text based on the selection of the one or more portions of the predetermined text.

6. The method of claim 5, further comprising:
   generating the predetermined text relevant to at least one of the first text or the second text using one or more machine learning models.

7. The method of claim 1, the displaying of the first text comprising:
   displaying the first text in a minimized view.

8. The method of claim 1, the displaying of the newly generated text comprising:
   displaying the newly generated text in a minimized view.

9. The method of claim 1, the converting of the audio signals comprising:
   converting, in real-time, the audio signals comprising the speeches of a local first user and a remote second user into the text.

10. The method of claim 1,
    the displaying of the first text of speech comprising:
       displaying the first text of speech at a first staging area;
    the displaying of the second text of speech comprising:
       displaying the second text of speech at a second staging area; and
    the displaying of the newly generated text comprising:
       displaying the newly generated text at a third staging area.

11. A system comprising:
    a non-transitory storage medium storing computer program instructions; and
    one or more processors configured to execute the computer program instructions to cause the system to perform operations comprising:
       converting, in real-time into text, audio signals comprising speeches of a first user and a second user having a two-way audio communication;
       displaying first text of speech of the first user within a virtual reality environment;
       displaying a second text of speech of the second user within the virtual reality environment;
       displaying a selection tool within the virtual reality environment for selecting one or more portions of the first text and one or more portions of the second text; and
       in response to receiving a selection of the one or more portions of the first text and the one or more portions of the second text, displaying a newly generated text comprising the selected one or more portions of the first text and the selected one or more portions of the second text within the virtual reality environment.

12. The system of claim 11, the operations further comprising:
    displaying a virtual keyboard within the virtual reality environment;
    receiving a selection of one or more keys of the virtual keyboard; and
    augmenting the newly generated text based on the selection of the one or more keys of the virtual keyboard.

13. The system of claim 11, the operations further comprising:
    displaying a virtual keyboard within the virtual reality environment;
    receiving a selection of one or more keys of the virtual keyboard; and
    populating a text entry field based on the selection of the one or more keys of the virtual keyboard.

14. The system of claim 11, the operations further comprising:
    displaying a virtual panel with keys with special characters and punctuation marks within the virtual reality environment;
    receiving a selection of one or more keys of the virtual panel; and augmenting the newly generated text based on the selection of the one or more keys of the virtual panel.

15. The system of claim 11, the operations further comprising:
displaying predetermined text in another staging area;
receiving a selection of one or more portions of the predetermined text; and
augmenting the newly generated text based on the selection of the one or more portions of the predetermined text.

16. The system of claim 15, the operations further comprising:
generating the predetermined text relevant to at least one of the first text or the second text using one or more machine learning models.

17. The system of claim 11, the displaying of the first text comprising:
displaying the first text in a minimized view.

18. The system of claim 11, displaying of the newly generated text comprising:
displaying the newly generated text in a minimized view.

19. The system of claim 11, the converting of the audio signals comprising:
converting, in real-time, the audio signals comprising the speeches of a local first user and a remote second user into the text.

20. The system of claim 11,
the displaying of the first text of speech comprising:
displaying the first text of speech at a first staging area;
the displaying of the second text of speech comprising:
displaying the second text of speech at a second staging area; and
the displaying of the newly generated text comprising:
displaying the newly generated text at a third staging area.

* * * * *